Patented June 8, 1948

2,443,033

UNITED STATES PATENT OFFICE 2,443,033

ANTIFOULING PAINT COMPOSITIONS AND PROCESS OF MAKING THE SAME

Charles J. Greenstreet, Summit, N. J., assignor to Universe Holding Corporation, New York, N. Y., a corporation of New York No Drawing. Application July 27, 1943, Serial No. 496,305

7 Claims. (Cl. 106—15)

This invention relates to new organic powerful ptomaine poisons, particularly for ship bottoms paint and coatings to prevent barnacle and like deposits on ships, aeroplane pontoons, wharves, docks and everywhere where sea water comes in contact with these and like surfaces.

This group of poisons is so powerful and terribly effective that they kill barnacles and the like by paralysis and quick death before the barnacle can attach itself to a surface and, incidentally kills bryozoans, marine algae, teredos, and practically all animal and vegetable life that comes in contact with it.

Marine animals such as barnacles eject a cement like slime substance containing calcium carbonate and this material adheres to the surface of metal, wood or other material on which barnacles intend to fasten themselves. The barnacle thus uses this material which leaves a deposit of calcium carbonate to fasten itself to whatever surface is in its immediate neighborhood. Therefore, any poison as set out below which will kill the barnacle before it can even attach itself to a surface will prevent barnacle deposits.

Bacteria are unicellular forms of vegetable life and the excretions of bacteria that feed on nitrogenous products are ptomaines or toxins. These unicellular bacteria that feed on the nitrogenous barnacles excrete the toxins and ptomaines that I use to cause paralysis and almost instant death to barnacles, bryozoans, marine algae and the like. It is well known that there are large series of ptomaines and poisons formed by bacteria feeding on nitrogenous material and in the decomposition and putrefaction of the nitrogenous barnacles there is formed amines and diamines and amino acids, etc., although the original amino esters may be basic in character. I have discovered certain of these ptomaines which are extremely poisonous such as mytilotoxin, $C_6H_{15}NO_2$, and its homologues which commonly occur in decomposed mussels and often in small proportions even in living mussels, may be artificially cultivated under suitable conditions and according to the process hereinafter set forth, the material incorporating mytilotoxin and its toxic homologues or like poisons is mixed with a proper proportion of carriers to form a protective paint or plastic coating and the like. Among the putrefactive bacteria responsible for the development of the poisonous ptomaines which I employ are Clostridium aerofoetidum, C. bifermentans, C. histolyticum, C. leutoputrescens, C. ovalaris, C. parabotulinum, C. parasporogenes, C. putrefaciens, C. sporogenes, and C. tyrosinogenes.

As one example of my invention, I take barnacles at the seed stage before any shell is formed thereon, and these barnacles are partially dehydrated and then in a mass not over a foot in depth are gradually allowed to decompose. This decomposition preferably takes place at a temperature between 50 and 85 degrees Fahrenheit, and during the progress of the same, the mass is turned over occasionally so as to provide the necessary contact with the oxygen of the air and normally the maximum putrefaction will take place in about six to seven or so days.

Samples of the mass are taken from time to time to test the progress of the decomposition. When the percentage of mytilotoxin or other like toxic ptomaines as determined by chemical analysis or by experience is found at its maximum, further decomposition is stopped by drying the mass at a temperature of from 100 to 140 degrees Fahrenheit but under conditions so that the mytilotoxin or other poisons are not destroyed, and it is then finely ground. The material then is mixed with the mass vehicle or carrier such as low water absorption plastics such as methyl methacrylate, vinyl copolymers or phenol formaldehyde, linseed oil paints, tung oil paints, varnishes or the like, not less than three per cent of the ground dried material being mixed with the vehicle to form an effective protective composition for ships bottoms, aeroplane pontoons and the like.

Instead of mixing the dried material containing mytilotoxin and other toxic ptomaines, it may also be treated with metallic copper, copper oxide, or copper carbonate to form copper salts of mytilotoxin which can be used in paints, varnishes or other coatings or as insecticide sprays or one can use other metallic oxides or carbonates to form the corresponding salt of mytilotoxin or other toxins.

I have also found that the dried material as above prepared may also be mixed with synthetic plastics in liquid or powdered form incorporated in the plastic carrier and will impart their protective qualities to such plastics.

A particularly powerful concentrated extract of mytilotoxins and its homologues and other soluble toxins can be made by extracting the fully decomposed barnacle material or other nitrogenous material with water or other solvent, evaporate the excess water or solvent at a temperature that does not destroy any of the toxic ptomaines, then separate the soluble toxins from the inert material by filtration and use either as set out above for dry material or mixed with metallic oxides or carbonates to form water insoluble salts.

While I have shown here in this embodiment the manufacture of this protective material by the decomposition of barnacles, it will be obvious that similar protective material may be made by decomposing mussels, oysters, shell fish, plankton, fish, meat, and other materials which form toxic ptomaines under certain conditions of decomposition and which ptomaines or toxins when properly incorporated into protective compositions may be used as above indicated. It is obvious that the toxins, when once incorporated into a protective vehicle such as a plastic coating of those plastics of low water absorption capacity or an oil paint or the like, will not suffer further decomposition and such paints will retain their potency for a period of time covering practically all commercial purposes.

The temperatures above given for the decomposition of the source material and for drying same are approximate merely and I do not wish to be limited to these exact temperatures.

Having fully described my invention, what I claim is:

1. A protective composition for ships bottoms and similar surfaces exposed to sea water, said composition comprising a water-resistant coating vehicle, and a toxic ptomaine incorporated therein in an amount sufficient for substantially preventing adhesion of barnacles and the like on said ships bottoms and similar surfaces.

2. A protective composition for ships bottoms and similar surfaces exposed to sea water, said composition comprising a water-resistant coating vehicle, and mytilotoxin incorporated therein in an amount sufficient for substantially preventing adhesion of barnacles and the like on said ships bottoms and similar surfaces.

3. A composition for protecting ships bottoms and similar surfaces exposed to sea water, said composition comprising a low water absorption plastic in which is incorporated the toxic ptomaines and poisons resulting from the decomposition and putrefaction of nitrogenous materials, in an amount sufficient for substantially preventing adhesion of barnacles and the like on said ships bottoms and similar surfaces.

4. A composition for protecting ships bottoms and similar surfaces exposed to sea water, said composition comprising a water-resistant paint vehicle in which is incorporated the toxic ptomaines and poisons resulting from the decomposition and putrefaction of nitrogenous materials, in an amount sufficient for substantially preventing adhesion of barnacles and the like on said ships bottoms and similar surfaces.

5. A composition for protecting ships bottoms and similar surfaces exposed to sea water, said composition comprising a water-resistant coating vehicle in which is incorporated a dry powder resulting from the decomposition and putrefaction of barnacles and containing toxic ptomaines and poisons resulting from said decomposition, and putrefaction, in an amount sufficient for substantially preventing adhesion of barnacles and the like on said ships bottoms and similar surfaces.

6. A process of preparing a paint composition for protecting ships bottoms and similar surfaces exposed to sea water, said process comprising collecting barnacles in the seed stage, subjecting same to decomposition and putrefaction by permitting said barnacles to stand in contact with air until a maximum of toxicity of the decomposed product is attained, inhibiting further decomposition in the seed mass by drying said mass and incorporating same into a water-resistant paint vehicle in an amount sufficient for substantially preventing adhesion of barnacles and the like on said ships bottoms and similar surfaces.

7. A method of producing a composition for protecting ships bottoms and similar surfaces exposed to sea water, said process comprising gathering seed barnacles, subjecting same to decomposition and putrefaction at a temperature of from 50°–85° Fahrenheit, stopping said decomposition and putrefaction in the seed mass when the maximum of toxicity of the decomposed product is attained by drying said mass and incorporating said mass in a water-resistant paint vehicle in an amount sufficient for substantially preventing adhesion of barnacles and the like on said ships bottoms and similar surfaces.

CHARLES J. GREENSTREET.

REFERENCES CITED

The following references are of record in the file of this patent:

UNITED STATES PATENTS

| Number | Name | Date |
|---|---|---|
| 2,287,218 | Young et al. | June 23, 1942 |
| 1,960,251 | Mano | Mar. 29, 1934 |
| 1,960,250 | Mano | Mar. 29, 1934 |

FOREIGN PATENTS

| Number | Country | Date |
|---|---|---|
| 10,328 | Great Britain | of 1900 |
| 1,947 | Great Britain | of 1863 |

OTHER REFERENCES

Hachk's Chemical Dictionary, 2nd ed. 1937, page 763.

Tanner, Bacteriology, 3rd ed., 1938, pages 351–352.